3,707,468
3,3a - DIHYDROPYRROLO[1,2-a]QUINAZOLINE-1,5(2H,4H)-DIONES AND RELATED INTERMEDIATES
Stanley C. Bell, Penn Valley, and George T. Conklin, Havertown, Pa., assignors to American Home Products Corporation, New York, N.Y.
No Drawing. Continuation-in-part of application Ser. No. 689,007, Dec. 8, 1967. This application June 15, 1970, Ser. No. 46,523
Int. Cl. C07d 51/48
U.S. Cl. 260—256.4 Q                          6 Claims

ABSTRACT OF THE DISCLOSURE

This invention concerns 1,2,3,3a - tetrahydro-1-iminopyrrolo[1,2 - a]quinazolin-5(4H)-ones and 3,3a-dihydropyrrolo[1,2 - a]quinazoline - 1,5(2H,4H) - diones. The former compounds are useful intermediates in the preparation of the latter which are pharmacologically active as anti-edema agents.

CROSS-REFERENCE TO RELATED APPLICATION

This application is a continuation-in-part of Ser. No. 689,007, now abandoned, filed Dec. 8, 1967.

BACKGROUND OF THE INVENTION

This invention relates to new and novel nitrogen containing tricyclic compounds. In particular, this invention is concerned with 1,2,3,3a-tetrahydro - 1 - iminopyrrolo [1,2-a]quinazolin-5(4H)-ones which are useful intermediates in the preparation of their corresponding 3,3a-dihydropyrrolo[1,2 - a]quinazoline-1,5(2H,4H)-diones. Both the intermediate iminoquinazolinones and the final quinazolinediones in standard pharmacological tests in animals prevent edema induced by the presence of a foreign irritant.

SUMMARY OF THE INVENTION

The new and novel compounds within the purview of the present invention are illustrated by the following formula:

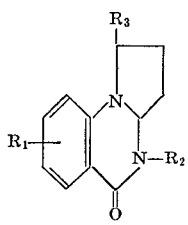

wherein $R_1$ is selected from the group consisting of hydrogen and halogen; $R_2$ is selected from the group consisting of hydrogen, lower alkyl and di(lower)alkylamino (lower)alkyl; and $R_3$ is selected from the group consisting of oxo and imino. The term "lower alkyl" and "lower alkoxy" as employed herein are meant to include both branched and straight chain moieties containing from about one to about eight carbon atoms. The term "halogen" means the chloride, bromide, and iodide radicals. Typical examples of these compounds are:

1-imino-1,2,3,3a-tetrahydropyrrolo[1,2-a]quinazolin-5(4H)-one;
7-chloro-1,2,3,3a-tetrahydro-1-imino-4-methyl-pyrrolo[1,2-a]quinazolin-5(4H)-one;
7-chloro-3,3a-dihydropyrrolo[1,2-a]quinazoline-1,5(2H,4H)-dione; and
8-chloro-3,3a-dihydropyrrolo[1,2-a]quinazoline-1,5(2H,4H)-dione.

DESCRIPTION OF THE PREFERRED EMBODIMENT

The compounds of the present invention may be prepared by the process which is schematically set forth as follows:

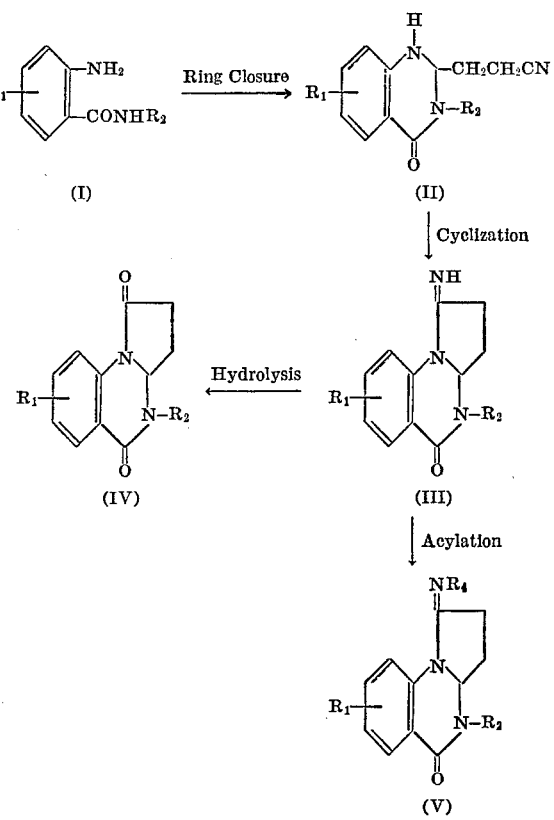

wherein $R_1$ and $R_2$ are defined as above and $R_4$ is acyl. The ring closure is effected by contacting an appropriate anthranilamide (I) with 4,4-dimethoxybutyronitrile in an alkanol or in an alkanol-water mixture, in the presence of a mineral acid, at a temperature range from about 20° C. to about reflux temperatures for a period of about fifteen minutes to about six hours. Preferably this reaction is conducted in an ethanol-water mixture, in the presence of hydrochloric acid, at about room temperature.

When the ring closure is complete, the resulting 2-(2-cyanoethyl)-1,2-dihydro-4(3H)quinazoline (II) is separated by conventional procedures. For example, the reaction mixture is filtered and the product (II) recrystallized from a suitable solvent, e.g., an alkanol.

The cyclization reaction of the present invention is conducted by contacting an above prepared 2-(2-cyanoethyl)-1,2-dihydro-4(3H)quinazolinone (II) with an alkali metal hydroxide in an alkanol for a period of about one-half to about three hours. Preferably this reaction is conducted in ethanol, with sodium hydroxide.

When the cyclization is complete, the resulting 1-imino-1,2,3,3a-tetrahydropyrrolo[1,2-a]quinazoline-5(4H) - one (III) is separated by standard recovery procedures. For example, the reaction mixture is diluted with water, filtered, the solid washed with water and an alkanol, and then recrystallized from an appropriate solvent, e.g., acetonitrile.

The hydrolysis reaction is effected by contacting an appropriate above prepared 1-imino-1,2,3,3a-tetrahydropyrrolo[1,2-a]quinazoline-5-(4H)-one (III) with a mineral acid at a temperature range from about 60° C. to about 100° C. for a period of about one to eight hours.

Preferably this reaction is conducted with hydrochloric acid.

When the hydrolysis is complete, the resulting 3,3a-dihydropyrrolo[1,2-a]quinazoline-1,5(2H,4H) - dione (V) is recovered by standard techniques. For example, the reaction mixture is filtered and the collected product (IV) recrystallized from a suitable solvent, e.g., acetonitrile.

The 1-imino-1,2,3,3a-tetrahydropyrrolo[1,2-a]quinazoline-5-(4H)-ones (III) of the present invention may be acylated to afford their corresponding 1-acylimino-1,2,3,3a-tetrahydropyrrolo[1,2-a]quinazoline-5-(4H)-one (V). Such compounds are easily prepared by standard acylating procedures. One such procedure is explained in Example VIII wherein the 1-imino-1,2,3,3a-tetrahydropyrrolo[1,2-a]quinazoline-5(4H)-one (III) is reacted with a carboxylic acid anhydride at about reflux temperatures for about five minutes. When the acylation is complete, the reaction mixture is concentrated, and the product (V) may be recrystallized from a suitable solvent.

An alternate procedure for the preparation of the 4-lower alkyl-3,3a-dihydropyrrolo[1,2-a]quinazoline - 1,5 (2H,4H)-diones and 4-di(lower)alkylamino(lower)alkyl-3,3a - dihydropyrrolo[1,2-a]quinazoline-1,5(2H,4H) - diones of this invention is illustrated in Example V. Therein sodium hydride and an appropriate 4-unsubstituted-3,3a-dihydropyrrolo[1,2-a]quinazolin-1,5(2H,4H)-dione are reacted at about 70° C. for about one hour to afford the corresponding sodium salt which is then reacted with a lower alkylamino(loweralkyl-3,3a - dihydropyrrolo[1,2-a]quinazoline-1,5(2H,4H)-diones.

It will be apparent to one skilled in the art of chemistry that the benzene moiety of the anthranilamide (I) starting material can be substituted with groups other than halogen without affecting the course of the subsequent reactions. Accordingly the benzene moiety of the starting materials can be substituted with a lower alkyl, lower alkoxy, or sulfamoyl radical.

The anthranilamides (I) employed as starting materials in the above-described process are commercially available, or may be prepared by the procedures described by R. Staiger and E. Miller in J.O.C. 24, 1214 (1959); R. Clark and E. Wagner in J.O.C. 9, 55 (1944); and R. Staiger and E. Wagner in J.O.C. 18, 1427 (1953).

The 1-imino-1,2,3,3a-tetrahydropyrrolo[1,2-a]quinazolin-5(4H)-ones (III) of this invention are useful in the preparation of the 3,3a-dihydropyrrolo[1,2-a]quinazoline-1,5(2H,4H)-diones (IV) which in standard pharmacological tests in animals prevent local swelling induced by the presence of a foreign irritant, indicating usefulness as an anti-edema agent. The intermediate iminoquinazolinones (III) exhibit the same activity as the final products.

In the pharmacological testing of the compounds of the invention, the anti-edema activity is elicited by subjecting the compounds to be tested to the procedure described in the publication by Winter et al., Nature 179, 629 (1957). The compounds of the invention in rats prevent edema induced by carrageenin at an oral dose of from 25 mg. to 100 mg. of compound per kilogram of body weight.

The following examples are given by way of illustration and are not to be construed as limitations of this invention, many variations of which are possible without departing from the scope and spirit thereof.

EXAMPLE I

To a mixture of 17.0 g. of 5-chloroanthranilamide, 15.0 g. of 4,4-dimethoxybutyronitrile, 100 ml. of ethanol and 50 ml. of water, there is slowly added 100 ml. of 2.4 N hydrochloric acid. The solution is then stirred during which time a solid separates out. There is filtered off 22.0 g. of solid which is recrystallized from ethanol to afford 6-chloro-2-(2-cyanoethyl) - 1,2 - dihydro-4(3H)quinazolinone, M.P. 186–188° C.

*Analysis.*—Calcd. for $C_{11}H_{10}ClN_3O$: C, 56.05; H, 4.27; N, 17.85; Cl, 15.05. Found: C, 56.00; H, 4.59; N, 18.05; Cl, 14.9.

Similarly, the following compounds are prepared:

6-chloro-2-(2 - cyanoethyl)-1,2-dihydro - 3 - methyl-4-(3H)quinazolinone, M.P. 142–144° C., is prepared from N-methyl-5-chloroanthranilamide and 4,4-dimethoxybutyronitrile.

*Analysis.*—Calcd. for $C_{12}H_{12}ClN_3O$: C, 57.70; H, 4.85; N, 16.82; Cl, 14.20. Found: C, 57.45; H, 4.48; N, 16.30; Cl, 13.73.

7-chloro-2-(2-cyanoethyl) - 1,2 - dihydro-4(3H)-quinazolinone, M.P. 173–175° C., is prepared from 4-chloroanthranilamide and 4,4-dimethoxybutyronitrile.

*Analysis.*—Calcd. for $C_{11}H_{10}ClN_3O$: C, 56.05; H, 4.28; N, 17.83. Found: C, 55.92; H, 4.14; N, 18.00.

EXAMPLE II

To a mixture of 16.0 g. of 6-chloro-2(2-cyanoethyl)-1,2-dihydro-4(3H)-quinazolinone in 210 ml. of ethanol, there is added 21 ml. of 4 N sodium hydroxide. After stirring for several hours the solution is diluted with water, the resultant precipitate filtered, washed with water and ethanol giving 9.7 g. of product. Recrystallization from acetonitrile gives 7-chloro-1,2,3,3a-tetrahydro-1-iminopyrrolo[1,2-a]quinazoline-5-(4H)-one, M.P. 226–227° C.

*Analysis.*—Calcd. for $C_{11}H_{10}ClN_3O$: C, 56.05; H, 4.27; N, 17.85; Cl, 15.05. Found: C, 56.09; H, 4.13; N, 18.05; Cl, 15.0.

In the same manner, the following compounds are prepared:

1,2,3,3a - tetrahydro - 1 - iminopyrrolo[1,2-a]quinazolin-5(4H)-one, M.P. 194–196° C., is prepared from 2-(2-cyanoethyl)-1,2-dihydro-4(3H) - quinazolinone and sodium hydroxide.

*Analysis.*—Calcd. for $C_{11}H_{11}N_3O$: C, 65.67; H, 5.51; N, 20.88. Found: C, 65.57; H, 5.56; N, 21.08.

7-chloro - 1,2,3,3a - tetrahydro-1-imino-4-methylpyrrolo[1,2-a]quinazoline - 5(4H) - one from 6-chloro-(2-cyanoethyl)-1,2-dihydro-3-methyl - 3(3H) - quinazolinone and sodium hydroxide.

*Analysis.*—Calcd. for $C_{12}H_{12}ClN_3O$: C, 57.70; H, 4.85; N,16.82; Cl, 14.20. Found: C, 57.79; H, 4.51; N, 16.56; Cl, 14.20.

8-chloro-1,2,3,3a - tetrahydro - 1 - iminopyrrolo[1,2-a]quinazolin-5(4H)-one, M.P. 230–232° C., from 7-chloro-2-(2-cyanoethyl) - 1,2-dihydro-4(3H)-quinazolinone and sodium hydroxide.

*Analysis.*—Calcd. for $C_{11}H_{10}ClN_3O$: C, 56.05; H, 4.28; N, 18.82; Cl, 15.05. Found: C, 55.93; H, 4.05; N, 18.06; Cl, 14.8.

EXAMPLE III

When the procedure of Example II is repeated to react an appropriate 2 - (2 - cyanoethyl)-1,2-dihydro-4(3H)-quinazolinone with an alkali metal hydroxide the following 1,2,3 - 3a - tetrahydro - 1 - iminopyrrolo[1,2-a]quinazolin-5(4H)-ones are obtained:

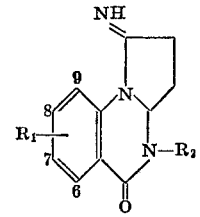

wherein the substituents $R_1$ and $R_2$ are defined as follows:

| $R_1$: | $R_2$: |
|---|---|
| 7—sulfamoyl | hydrogen |
| 7—bromo | ethyl |
| 9—methyl | dimethylaminoethyl |
| 8—iodo | hydrogen |
| 8—ethyl | butyl |
| 7—propyl | hydrogen |
| 6—methoxy | hydrogen |
| 7—fluoro | dimethylaminobutyl |
| 8—ethoxy | diethylaminopropyl |

EXAMPLE IV

A solution of 7.0 g. of 7 - chloro-1,2,3,3a-tetrahydro-1-iminopyrrolo[1,2-a]quinazolin - 5(4H) - one in 150 ml. of 1 N hydrochloric acid heated on the steam bath for four hours and then chilled. There is collected 4.0 g. of product, M.P. 223–225° C., which is recrystallized from acetonitrile to afford 7-chloro-3,3a-dihydropyrrolo-[1,2-a]quinazoline-1,5(2H,4H)-dione, M.P. 223–225° C.

*Analysis.*—Calcd. for $C_{11}H_9ClN_2O_3$: C, 55.83; H, 3.83; N, 11.84; Cl, 14.95. Found: C, 56.04; H, 3.96; N, 11.83; Cl, 14.9.

7-chloro - 3,3a - dihydro - 4 - methylpyrrolo[1,2-a]quinazoline-1,5(2H,4H) - dione, M.P. 142–144° C., is prepared according to the above procedure from 7-chloro-1,2,3,3a - tetrahydro - 1 - imino-4-methylpyrrolo[1,2-a]quinazolin-5(4H))-one and hydrochloric acid.

*Analysis.*—Calcd. for $C_{12}H_{11}ClN_2O_2$: C, 57.49; H, 4.42; N, 11.13; Cl, 14.15. Found: C, 57.18; H, 4.26; N, 10.70; Cl, 14.0.

8-chloro - 3,3a - dihydropyrrolo[1,2-a]quinazoline-1,5(2H,4H)-dione, M.P. 271–273° C., is prepared according to the above procedure from 8-chloro-1,2,3,3a-tetrahydro-1-iminopyrrolo[1,2-a]quinazoline - 5(4H)-one and hydrochloric acid.

*Analysis.*—Calcd. for $C_{11}H_9ClN_2O_3$: C, 55.83; H, 3.83; N, 11.84; Cl, 14.99. Found: C, 55.83; H, 3.83; N, 11.65; Cl, 14.9.

EXAMPLE V

To a mixture of 0.55 g. of 55% sodium hydride in 25 ml. of dimethylformamide, there is added 3.0 g. of 7-chloro-3,3a - dihydropyrrolo[1,2-a]quinazolin - 1,5(2H,4H)-dione in 30 ml. of dimethylformamide which is then warmed at 70° C. for forty-five minutes. The mixture is cooled and 2.0 g. of methyliodide added. After stirring for thirty minutes, a little water is added and the reaction mixture concentrated to dryness. The residue is washed with water and then recrystallized twice from ethanol giving 7-chloro-3,3a-dihydro-4-methylpyrrolo[1,2-a]quinazoline -1,5(2H,4H) - dione, M.P. 143–145° C.

7 - chloro - 4 - (2-dimethylaminoethyl)-3,3a-dihydropyrrolo[1,2-a]quinazoline-1,5(2H,4H) - dione, M.P. 99–102° C., is prepared according to the above procedure from 7-chloro-3,3a-dihydropyrrolo[1,2-a]quinazolin-1,5-(2H,4H)-dione and dimethylaminoethyl chloride.

*Analysis.*—Calcd. for $C_{15}H_{18}ClN_3O_2$: C, 58.54; H, 5.89; N, 13.65; Cl, 11.52. Found: C, 59.00; H, 5.64; N, 13.69; Cl, 11.4.

8-chloro - 3,3a -dihydro-4-methylpyrrolo[1,2-a]quinazoline-1,5(2H,4H)-dione, M.P. 170–172° C., is prepared according to the procedure from 8-chloro-3,3a-dihydropyrrolo[1,2-a]quinazolin-1,5-(2H,4H)-dione and methyl iodide.

*Analysis.*—Calcd. for $C_{12}H_{11}ClN_2O_2$: C, 57.49; H, 4.42; N, 11.18; Cl, 14.10. Found: C, 57.21; H, 4.20; N, 10.00; Cl, 14.1.

EXAMPLE VI

A solution of 18 g. of 3-cyanopropionaldehyde and 150 ml. of water is added to a solution of 33 g. of N-butyl-5-chloroanthranilamide, 30 ml. of conc. hydrochloric acid and 300 ml. of water. After stirring at room temperature, for one hour the solvent is removed in vacuo, the residue dissolved in alcohol and made alkaline with excess sodium hydroxide. The solvent is decanted from the resultant oily residue and the residue extracted with ether. The ether is removed, the residue extracted with 1 N hydrochloric acid, the acid solution heated on the steam bath for four hours and then extracted with ether. After removal of the ether, the residue is recrystallized from cyclohexane giving 4-butyl-7-chloro-3,3a-dihydropyrrolo[1,2-a]quinazoline-1,5(2H,4H)-dione, M.P. 79–81° C.

*Analysis.*—Calcd. for $C_{15}H_{17}ClN_2O_2$ (percent): C, 61.54; H, 5.85; N, 9.57; Cl, 12.11. Found (percent): C, 61.54; H, 5.58; N, 10.03; Cl, 12.1.

EXAMPLE VII

Repeating the procedure of Example IV, to react the iminotetrahydropyrroloquinazolinones of Example III with a mineral acid, the following 3,3a-dihydropyrrolo[1,2-a]quinazoline-1,5(2H,4H)-diones are obtained:

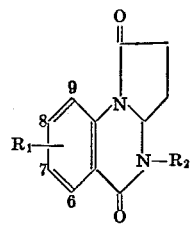

wherein the substituents $R_1$ and $R_2$ are defined as follows:

| $R_1$: | $R_2$: |
|---|---|
| 7—sulfamoyl | hydrogen |
| 7—bromo | ethyl |
| 9—methyl | dimethylaminoethyl |
| 8—iodo | hydrogen |
| 8—ethyl | butyl |
| 7—propyl | hydrogen |
| 6—methoxy | hydrogen |
| 7—fluoro | dimethylaminobutyl |
| 8—ethoxy | diethylaminopropyl |

EXAMPLE VIII

A mixture of 3.0 g. of 1,2,3,3a-tetrahydro-1-iminopyrrolo[1,2-a]quinazolin-5(4H)-one and 80 ml. of acetic anhydride is refluxed for two to three minutes and then concentrated to about one-third the volume. On cooling there is obtained 1.6 g. of product which when recrystalized from acetonitrile affords 1-acetylimino-1,2,3,3a-tetrahydropyrrolo[1,2-a]quinazoline - 5(4H) - one, M.P. 204–206° C.

*Analysis.*—Calcd. for $C_{13}H_{13}N_3O_2$: C, 64.18; H, 5.39; N, 17.28. Found: C, 64.00; H, 5.37; N, 16.90.

7-chloro-1-chloroacetylimino - 1,2,3,3a - tetrahydropyrrolo[1,2-a]quinazolin-5(4H)-one, M.P. 194–196° C., is prepared by a procedure similar to above from 7-chloro-1,2,3,3a-tetrahydro - 1 - iminopyrrolo[1,2-a]quinazolin-5(4H)-one and chloroacetic anhydride.

*Analysis.*—Calcd. for $C_{13}H_{11}Cl_2N_3O_2$: C, 49.86; H, 3.86; N, 13.42; Cl, 22.65. Found: C, 50.52; H, 3.57; N, 13.05; Cl, 22.50.

What is claimed is:

1. A compound selected from the group consisting of those having the formula:

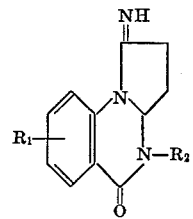

wherein $R_1$ is selected from the group consisting of hydrogen and halogen; and $R_2$ is selected from the group consisting of hydrogen, lower alkyl and di(lower)alkylamino(lower)alkyl.

2. A compound as described in claim 1 which is: 8-chloro - 1,2,3,3a-tetrahydro-1-iminopyrrolo[1,2-a]quinazolin-5(4H)-one.

3. A compound as described in claim 1 which is: 7-chloro-1-imino-1,2,3,3a-tetrahydro - 4 - methylpyrrolo[1,2-a]quinazolin-5(4H)-one.

4. A compound as described in claim 1 which is: 7-chloro - 1,2,3,3a-tetrahydro-1-iminopyrrolo[1,2-a]quinazolin-5(4H)-one.

5. A compound as described in claim 1 which is: 1,2,3,3a-tetrahydro - 1 - iminopyrrolo[1,2-a]quinazolin-5(4H)-one.

6. 7-chloro-4-(2-dimethylaminoethyl) - 3,3a - dihydro-pyrrolo[1,2-a]quinazoline-1,5(2H,4H)-dione.

References Cited

UNITED STATES PATENTS

| | | | |
|---|---|---|---|
| 3,375,250 | 3/1968 | Kirchner | 260—256.4 |
| 3,441,566 | 4/1969 | Houlihan | 260—251 |
| 3,475,432 | 10/1969 | Bell et al. | 260—251 |

ALEX MAZEL, Primary Examiner

R. V. RUSH, Assistant Examiner

U.S. Cl. X.R.

260—251 QA, 999